July 19, 1966 J. H. CULBERTSON 3,262,033
VARIABLE CAPACITOR
Filed Sept. 5, 1963 2 Sheets-Sheet 1
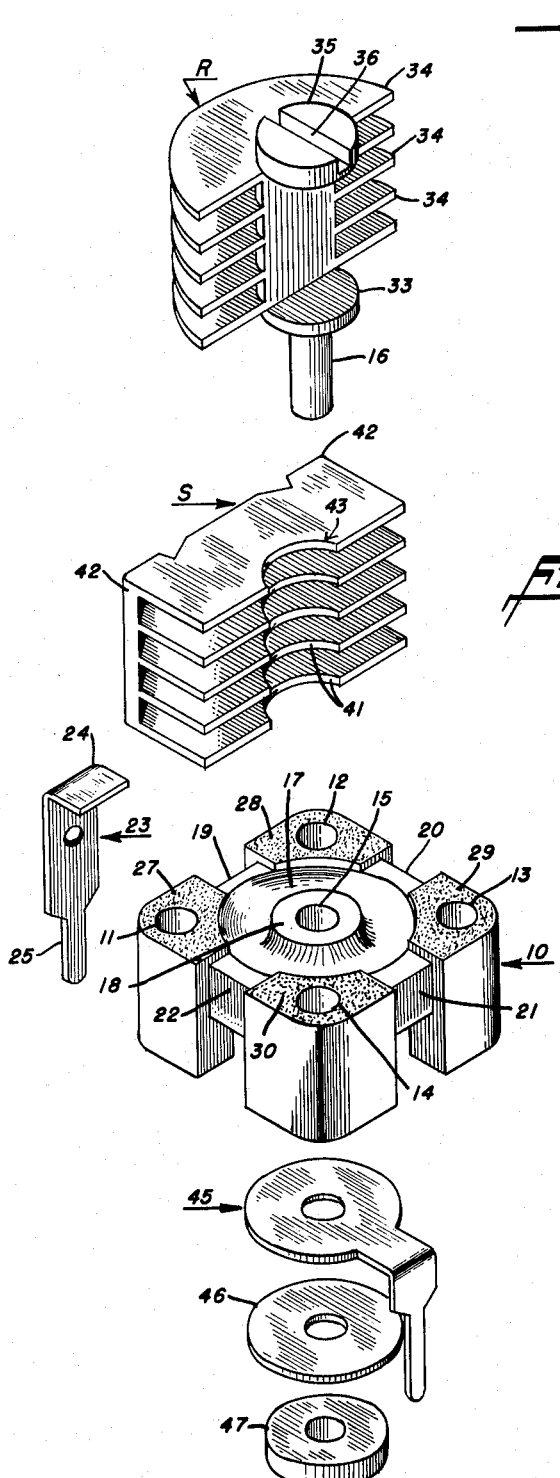
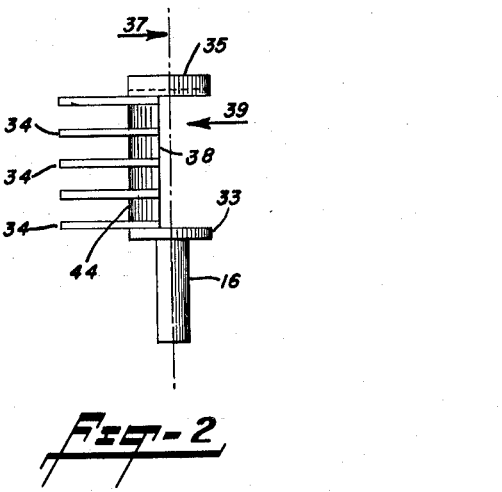
JOHN H. CULBERTSON
INVENTOR.
BY Rudolph␣L.␣Lurich
ATTORNEY July 19, 1966 J. H. CULBERTSON 3,262,033
VARIABLE CAPACITOR
Filed Sept. 5, 1963 2 Sheets-Sheet 2
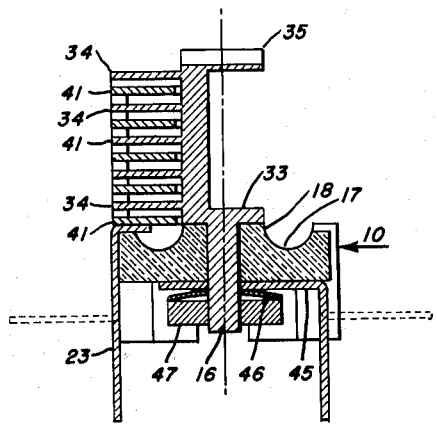
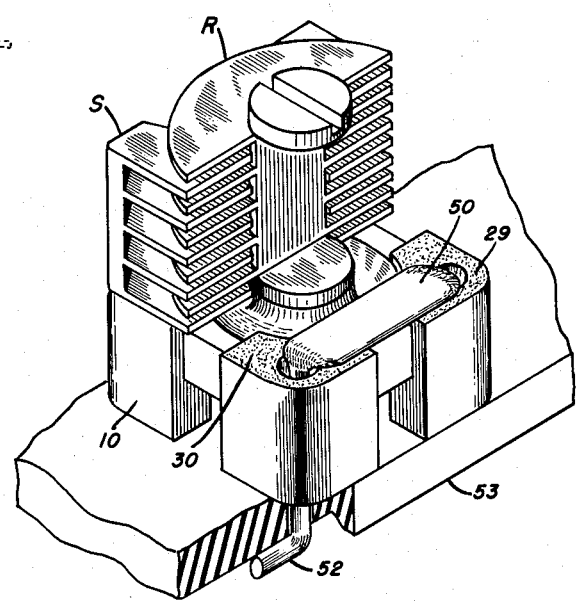
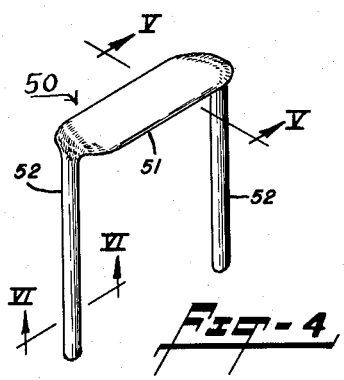
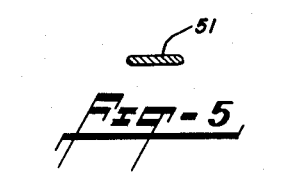
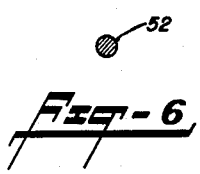
JOHN H. CULBERTSON
INVENTOR.
BY
ATTORNEY

3,262,033
VARIABLE CAPACITOR
John H. Culbertson, Blue Mill Road, Morristown, N.J.
Filed Sept. 5, 1963, Ser. No. 306,793
6 Claims. (Cl. 317—253)

This invention relates to capacitors and more particularly to a miniature variable capacitor having outstanding physical and electrical characteristics.

An object of this invention is the provision of a capacitor of novel construction and having a high Q even at ultra high frequencies, low microphonism and excellent shock resistance.

An object of this invention is the provision of a variable air capacitor formed of a minimum number of parts, having a uniform capacitance per degree rotation of the rotor blades, and a very high maximum to minimum capacitance ratio.

An object of this invention is the provision of a miniature variable air capacitor mounted on a symmetrical base adapted to support one or two sets of stationary blades and for carrying various types of terminals whereby the device readily can be arranged for front or rear panel or printed circuit mounting.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is an exploded, isometric view showing the component parts of a capacitor made in accordance with this invention;

FIGURE 2 is a side view of the rotor member;

FIGURE 3 is a vertical, central cross-sectional view of the assembled capacitor;

FIGURE 4 shows a U-shaped member for use when the capacitor is to be panel mounted;

FIGURES 5 and 6 are cross-sectional views taken along the lines V—V and VI—VI, respectively, of FIGURE 4; and FIGURE 7 is an isometric view showing the capacitor attached to a panel.

Reference, now, is made to FIGURE 1, wherein there is shown a symmetrical mounting base 10 made of a suitable ceramic with four (4) vertical holes 11, 12, 13 and 14 extending therethrough. Such mounting base is also provided with a central hole 15 for accommodating the shaft 16 of the rotor R. It may here be pointed out that the hole 15 is ground to size so that the rotor shaft will pass snugly therethrough with a minimum side play. Formed in the upper surface of the mounting base is a circular groove 17 having a concave bottom wall and thereby forming a boss 18. Also formed in the upper surface of the base are four radially-extending channels 19–22, which channels are adapted to receive electrical connector members. One type of electrical connector member is identified by the numeral 23 and comprises an offset end 24 designed to fit into the radial channel 19, and a reduced-width end 25 which extends beyond the bottom of the base when the connector is assembled thereon. It will be noted that each radial channel communicates with a vertical channel formed in the side wall of the mounting base. The body portion of the connector member 23 lies in such vertical channel thereby reducing the possibility of damage and short circuit when mounting the capacitor and connecting it to an electrical circuit.

The mounting base 10 is molded of ceramic, precision ground on the upper surface so the boss 18 and four corner members 27–30 are in the same plane. A silver paste is applied to the surfaces of the four corner members and the base is fired at a suitable temperature to thereby metalize these surfaces for the purpose of facilitating subsquent soldering operations. After this the center hole 15 is ground to the desired size with its axis precisely normal to that of the boss surface.

The rotor R is a unitary member machined from solid brass and comprises the shaft 16, an enlarged diameter shoulder 33, a plurality of semi-circular blades 34 and a head 35 provided with a diametrical slot 36. It will be noted that straight edges of the blades terminate in a plane parallel to and preferably spaced from the rotational axis 37 of the shaft and head (as best seen in FIGURE 2), and that such plane contains the bottom wall 38 of what essentially may be considered as a transverse slot 39 formed in the rotor unit, the end walls of such slot being defined by the upper surface of the shoulder 33 and the lower surface of the head 35. Such construction of the rotor reduces the minimum capacitance of the device without loss of the necessary structural strength. All surfaces of the rotor preferably are silver plated. The rotor is mounted on the mounting base 10 by passing the rotor shaft 16 through the central base hole 15 and electrical connection to the rotor is made by means of a connection member 45 that is secured to the rotor shaft by means of a spring washer 46 and a washer 47, as will be described hereinbelow with specific reference to FIGURE 3.

The stator S also is a unitary member machined from solid brass and comprises a plurality of blades 41 joined together by vertical corner members 42 and provided with a semi-circular central section 43 having a diameter somewhat greater than the diameter of the central portion of the rotor identified by the numeral 44 in FIGURE 2. All surfaces of the stator preferably are silver plated.

To assembled the capacitor, the rotor is positioned on the mounting base with the rotor shoulder 33 resting upon the boss 18. The stator is then placed upon two corner members of the base as, for example, the corner members 27 and 28. The connector member 23 is now positioned in the vertical channel of the base with the offset end disposed in the radial channel 19 and under the stator. This assembly is placed into a suitable fixture to maintain the rotor and the stator in proper alignment, and solder and heat applied to solder the stator to the metalized surfaces of the corner members 27, 28 and to the offset end of the connector member.

Referring, now, to FIGURE 3, the rotor is secured to the mounting base 10 by means of the relatively heavy washer 47 which is force-fitted over the rotor shaft 16, thereby clamping the connector member 45 and the spring washer 46 against the surface of the base and providing a good electrical contact between the connector member and the rotor. The circular groove 17 results in an increased electrical path between the rotor and stator thereby increasing the operating voltage and resistance of the capacitor and reducing the minimum capacity. Also, the connector member 23 is soldered to the center of the stator blades thereby reducing the lead length which promotes improved efficiency. By cutting out the normally round shaft of the rotor, the minimum capacitance of the device is decreased, thereby resulting in a very high maximum to minimum capacitance ratio. By eliminating unnecessary metal parts, such as terminal posts, rivets, eyelets, etc., the Q of the capacitor is increased substantially. By actual measurement, a capacitor made as herein described has a Q of 9,000 at 25 megacycles as compared to a substantially lower Q for similar capacitors heretofore available. The described mounting of the rotor on the ceramic base and the soldering of the stator directly to the base results in the device having excellent shock resistance, low microphonism and a smooth, long, operating life, as well as a uniform capacitance change per degree rotation of the rotor.

It will be noted (see FIGURE 1) that the ends of the connector members 23 and 45 are of reduced thickness and constitute, essentially, pin type terminals to facilitate the mounting and electrical connection of the capacitor in printed circuits. If desired, these ends may be offset, as shown by the dotted lines in FIGURE 3, for surface mounting of the capacitor.

The capacitor can readily be arranged for panel mounting as will now be described with reference to FIGURES 4–7. FIGURE 4 shows a U-shaped member, or staple, 50. Preferably, the base portion 51 is flattened, as shown in FIGURE 5, whereas the leg portions 52 are of circular cross section, as shown in FIGURE 6. The member 50 is pre-tinned, inserted into adjacent corner holes in the mounting base 10 and soldered to the metalized surfaces of the corner member 29 and 30, see FIGURE 7. The ends of the U-shaped member can then be inserted through holes provided in a panel 53 and the protruding portions thereof bent over, or clinched, on the under side of the panel. Alternatively, a panel mounting of the capacitor can be effected by means of conventional screws, rivets, etc., instead of the U-shaped member, as described. Still further, the bottom surface of the ceramic base can be metalized and pre-tinned, whereby the capacitor can be soldered directly to a metal support or panel.

It will be apparent that in the absence of the U-shaped member 50 (FIGURE 2), the metalized corner members 29 and 30 can be utilized to support a second stator to provide a differential capacitor.

Having now described the invention, those skilled in this art will be able to make various changes and modifications in the illustrated constructions of the capacitor without thereby departing from the scope and spirit of the invention as set forth in the following claims.

I claim:

1. A rotor for a multi-blade air capacitor, said rotor being made of a single piece of metal and comprising,
    (a) a lower portion in the form of a shaft which terminates in an enlarged-diameter shoulder portion,
    (b) an axially-spaced upper portion in the form of a head having a slot formed therein,
    (c) an intermediate portion having a mono-planar surface extending between the said shoulder portion and the said head, and
    (d) a plurality of axially-spaced blades extending from the said intermediate portion and lying in planes normal to the said mono-planar surface, each blade having a straight edge lying in the plane of said mono-planar surface.

2. The invention as recited in claim 1, the said mono-planar surface is spaced from the axis of the said shaft in the direction of the said blades, and the said blades are semi-circular.

3. A capacitor comprising,
    (a) a substantially square ceramic base having a central boss with a hole extending therethrough and metalized corner surfaces,
    (b) a multi-blade stator having the lower blades soldered to adjacent metalized corner surfaces of the base,
    (c) a one-piece rotor having a shaft passing through the said central hole and terminating in an enlarged-diameter portion which rests upon the surface of the said boss, a transverse slot formed in the said enlarged-diameter portion and a plurality of semi-circular blades extending from the said enlarged-diameter portion, said blades having straight edges coplanar with the wall defining the bottom of said transverse slot,
    (d) means securing the rotor to the base.

4. The invention as recited in claim 3 including a first connection terminal extending under the said stator and soldered thereto, a second connection terminal having a hole formed therein and through which the rotor shaft passes, and wherein the means securing the rotor to the base comprises a spring washer positioned on the rotor shaft and a locking member force-fitted on the rotor shaft and clamping the said second terminal and the spring washer against the said base.

5. The invention as recited in claim 3, wherein the transverse slot has a depth exceeding the radius of the said enlarged-diameter portion.

6. A capacitor comprising,
    (a) a square ceramic base having a central hole extending therethrough, the upper surface of the base having a circular groove defining a central boss and said groove communicating with four diametrically-opposed channels each of which extends to a side of the base and thereby forming four corner surfaces on the base,
    (b) metal coatings fired on to the said four corner surfaces,
    (c) a multi-blade stator soldered to the coatings of two adjacent corner surfaces,
    (d) a first terminal member having an end disposed in one of the said channels and soldered to the stator,
    (e) a one-piece rotor having a shaft passing through the said central hole and terminating in an enlarged-diameter portion which rests upon the surface of the said boss, a transverse slot formed in the said enlarged-diameter portion and a plurality of semi-circular blades extending from the said enlarged-diameter portion, said blades having straight edges coplanar with the wall defining the bottom of said transverse slot,
    (f) a second terminal member having a hole formed therein and positioned on the shaft,
    (g) a spring washer on the shaft, and
    (h) a locking member force-fitted on to the shaft and clamping the said second terminal and spring washer to the base.

References Cited by the Examiner

UNITED STATES PATENTS

| | | | |
|---|---|---|---|
| 1,652,118 | 12/1927 | Guett | 317—253 X |
| 1,898,808 | 2/1933 | Benjamin | 317—251 |
| 2,290,875 | 7/1942 | Greibach | 317—253 X |
| 3,129,364 | 4/1964 | Oxley | 317—253 |

LARAMIE E. ASKIN, *Primary Examiner.*

ROBERT K. SCHAEFER, *Examiner.*

E. GOLDBERG, *Assistant Examiner.*